United States Patent [19]
Kishi

[11] Patent Number: 5,018,914
[45] Date of Patent: May 28, 1991

[54] CHAMFERING TOOL

[75] Inventor: Katsunobu Kishi, Tokyo, Japan

[73] Assignee: Nitto Kohki Co., Ltd., Tokyo, Japan

[21] Appl. No.: 530,416

[22] Filed: May 30, 1990

[30] Foreign Application Priority Data

Jun. 5, 1989 [JP] Japan .................. 1-65509[U]

[51] Int. Cl.⁵ .............................................. B23C 1/20
[52] U.S. Cl. ............................... 409/178; 144/134 D; 144/136 C; 409/180
[58] Field of Search ............... 409/138, 175, 179, 180, 409/181, 182, 204, 214; 408/14, 113, 202, 241 S; 144/134 D, 136 C

[56] References Cited

U.S. PATENT DOCUMENTS

| | | | |
|---|---|---|---|
| 3,040,631 | 6/1962 | Ikantz | 409/181 |
| 3,179,136 | 4/1965 | De Santis | 144/134 D |
| 3,196,749 | 7/1965 | Zanni | 409/180 |
| 3,762,452 | 10/1973 | Bernald | 144/134 D |
| 3,935,788 | 2/1976 | Gilmore | 144/134 D |
| 4,552,496 | 11/1985 | Johannesson | 409/204 |
| 4,752,158 | 6/1988 | Riley | 408/241 S |
| 4,792,266 | 12/1988 | Willis | 409/182 |

FOREIGN PATENT DOCUMENTS 7415364 7/1975 Fed. Rep. of Germany .

Primary Examiner—Z. R. Bilinsky
Attorney, Agent, or Firm—Nixon & Vanderhye

[57] ABSTRACT

A portable chamfering tool comprises a casing; a rotating shaft projected from one end of the casing; a ring-shaped connector arranged on the outer circumference of the rotating shaft, and having a ring-shaped groove formed on the outer circumference of the ring-shaped connector; a ring-shaped boss attached to the outer circumference of the ring-shaped connector so as to freely move in the axial direction of the connector; a guide plate attached to the ring-shaped boss; adjusting and fixing rings screwed onto the ring-shaped boss, the adjusting ring having a recess formed at the upper portion thereof; a connecting plate movably arranged in the recess of the adjusting ring and urged to the center of the ring-shaped connector to engage the ring-shaped groove on the outer circumference of the ring-shaped connector; a cutter chip fixed to the rotating shaft, which passes through the ring-shaped boss, with a part of it projected downward from the underside of the guide plate, and a guide attached to the rotating shaft and contactable with a side of a matter to be processed.

7 Claims, 3 Drawing Sheets

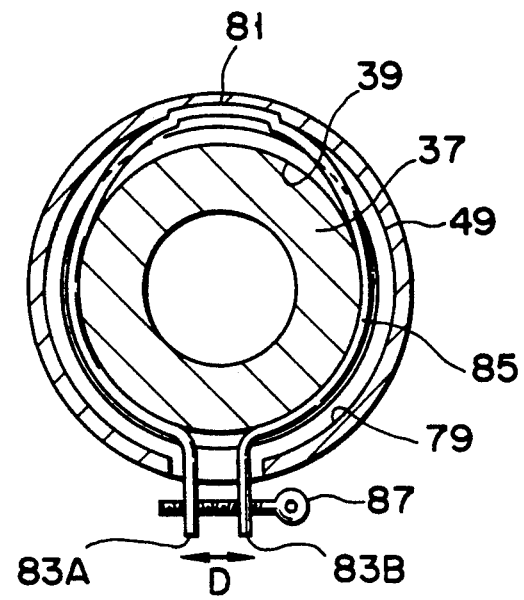
F I G. 4
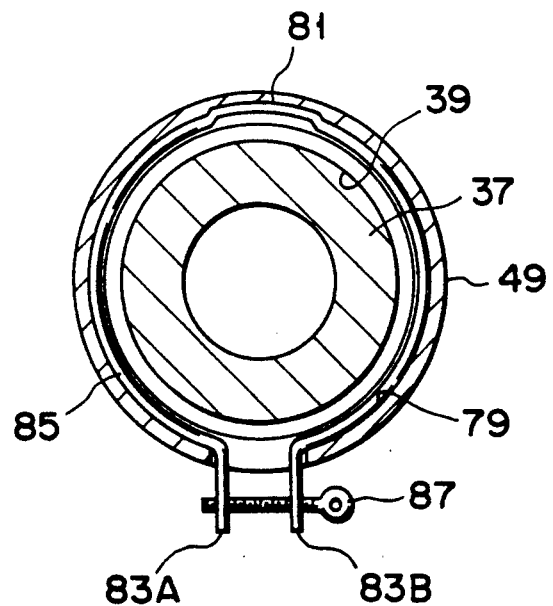
F I G. 5

CHAMFERING TOOL

BACKGROUND OF THE INVENTION

1. Field of the Invention

The present invention relates to a portable chamfering tool capable of chamfering the rims of a matter to be processed and also chamfering those of holes and grooves in the matter.

2. Description of the Related Art

The conventional chamfering tool intended to chamfer rims or edges of a matter to be processed by the rotating cutter which has cutting blades along its outer circumference comprises a body provided with the cutter at the front end thereof, guide planes perpendicular to each other and attached to the body, and a guide for exposing the cutting blade of the cutter obliquely between the right-angled guide planes. This chamfering tool is moved along the rim of the matter to chamfer the rim thereof while contacting the perpendicularly-crossed guide planes with those faces of the matter which form the rim at their ends.

In the case of the conventional chamfering tool, however, the perpendicularly-crossed guide planes arranged adjacent to the cutting blade becomes an obstacle to smoothly move the chamfering tool along the inner face of a hole in the matter when the inner rim of the hole is to be chamfered. This causes the chamfering not to be carried out with efficiency.

In order to solve this problem, the applicant of the present invention disclosed in his Japanese Patent Application Sho No. 63-114293 a chamfering tool comprising a housing in which a motor is housed, a guide plate attached to one end of the housing, a rotating shaft projected from the guide plate, cutting blades fixed to the rotating shaft with one of them projected downward from the guide plate, and a guide located nearer to the front end of the rotating shaft than the cutting blades and contactable with that side of the matter which has the rim at the top thereof. The chamfering tool can be moved to chamfer the rim of a hole or curved portion of the matter by a predetermined amount, mounting the guide plate on the horizontal face of the matter and contacting the guide with the inner face of the hole or the curved portion of the matter.

The chamfering tool having the above-described arrangement has solved the problem of the conventional tool in that the chamfering efficiency can be enhanced to a greater extent. In order to further enhance its workability, however, it needs systems for more easily adjusting the amount of the matter chamfered and exchanging the cutting blade with a new one.

SUMMARY OF THE INVENTION

The object of the present invention is therefore to provide a portable chamfering tool capable of more easily chamfering rims or edges of a matter to be processed and those of holes and grooves in the matter and provided with a simpler system for adjusting the chamfered amount of the matter and more easily exchanging the cutting blade with a new one.

This object of the present invention can be achieved by a portable chamfering tool comprising a casing; a rotating shaft projected from one end of the casing; a ring-shaped connector arranged on the outer circumference of the rotating shaft, and having a ring-shaped groove formed on the outer circumference of the ring-shaped connector; a ring-shaped boss attached to the outer circumference of the ring-shaped connector so as to freely move in the axial direction of the connector; a guide plate attached to the ring-shaped boss; adjusting and fixing rings screwed onto the ring-shaped boss, the adjusting ring having a recess formed at the upper portion thereof; a connecting plate movably arranged in the recess of the adjusting ring and urged to the center of the ring-shaped connector to engage the ring-shaped groove on the outer circumference of the ring-shaped connector; a cutter chip fixed to the rotating shaft, which passes through the ring-shaped boss, with a part of it projected downward from the underside of the guide plate; and a guide attached to the rotating shaft and contactable with a side of a matter to be processed.

According to the portable chamfering tool of the present invention, the chamfered amount of the matter to be processed can be adjusted as follows: The fixing ring is loosened and the adjusting ring is rotated. When the adjusting ring is rotated, the ring-shaped boss screwed onto the adjusting ring is moved in the axial direction thereof. The extent to which the cutting blade of the cutter chip is projected downward from the underside of the guide plate can be changed little by little by this axial movement of the ring-shaped boss. When the extent of the cutting blade projected is determined, the fixing ring is tightened to fix the adjusting ring.

When rims of the matter or those of holes and grooves in the matter are to be chamfered, the guide plate is placed on the horizontal plane of the matter, facing the cutting blade at the rim of the matter or that of the hole and groove in the matter and the guide at that side of the matter which has at the end thereof the rim to be chamfered. When the rotating shaft is rotated under this state and the chamfering tool is moved, contacting the guide with the side of the matter, the rim of the matter is cut and chamfered by the cutting blade of the cutter chip by a predetermined amount.

When the cutting blade of the cutter chip is to be exchanged with a new one, the connecting plate is pushed against the spring and released from the ring-shaped groove of the ring-shaped connector. The ring-shaped boss is moved in the axial direction thereof and detached from the ring-shaped connector. The cutting blade of the cutter chip is thus exposed completely outside the tool and this enable the cutting blade to be exchanged with a new one. In the case of another example of the portable chamfering tool according to the present invention in which a connecting ring is used, both free ends of the connecting ring are spread by a spreading member to move those parts of the connecting ring which are engaged with the ring-shaped groove of the ring-shaped connector to the groove of the adjusting ring and release them from the ring-shaped groove of the ring-shaped connector. The ring-shaped boss is then moved in the axial direction thereof and detached from the ring-shaped connector. The cutting blade of the cutter chip is thus exposed completely outside the tool and this enables the cutting blade to be exchanged with a new one.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1 and 2 show an example of the chamfering tool according to the present invention, in which FIG. 1 is a front view showing the chamfering tool vertically sectioned and FIG. 2 a front view showing the tool horizontally sectioned along a line II—II in FIG. 1; and FIGS. 3 through 5 show a second example of the chamfering tool according to the present invention, in which FIG. 3 is a front view showing ring-shaped connector and boss vertically sectioned, FIG. 4 a sectional plan taken along a line IV—IV in FIG. 3 and FIG. 5 a vertically sectioned plan showing a connecting ring loosened.

DETAILED DESCRIPTION OF THE PREFERRED EMBODIMENTS

Figure 1:
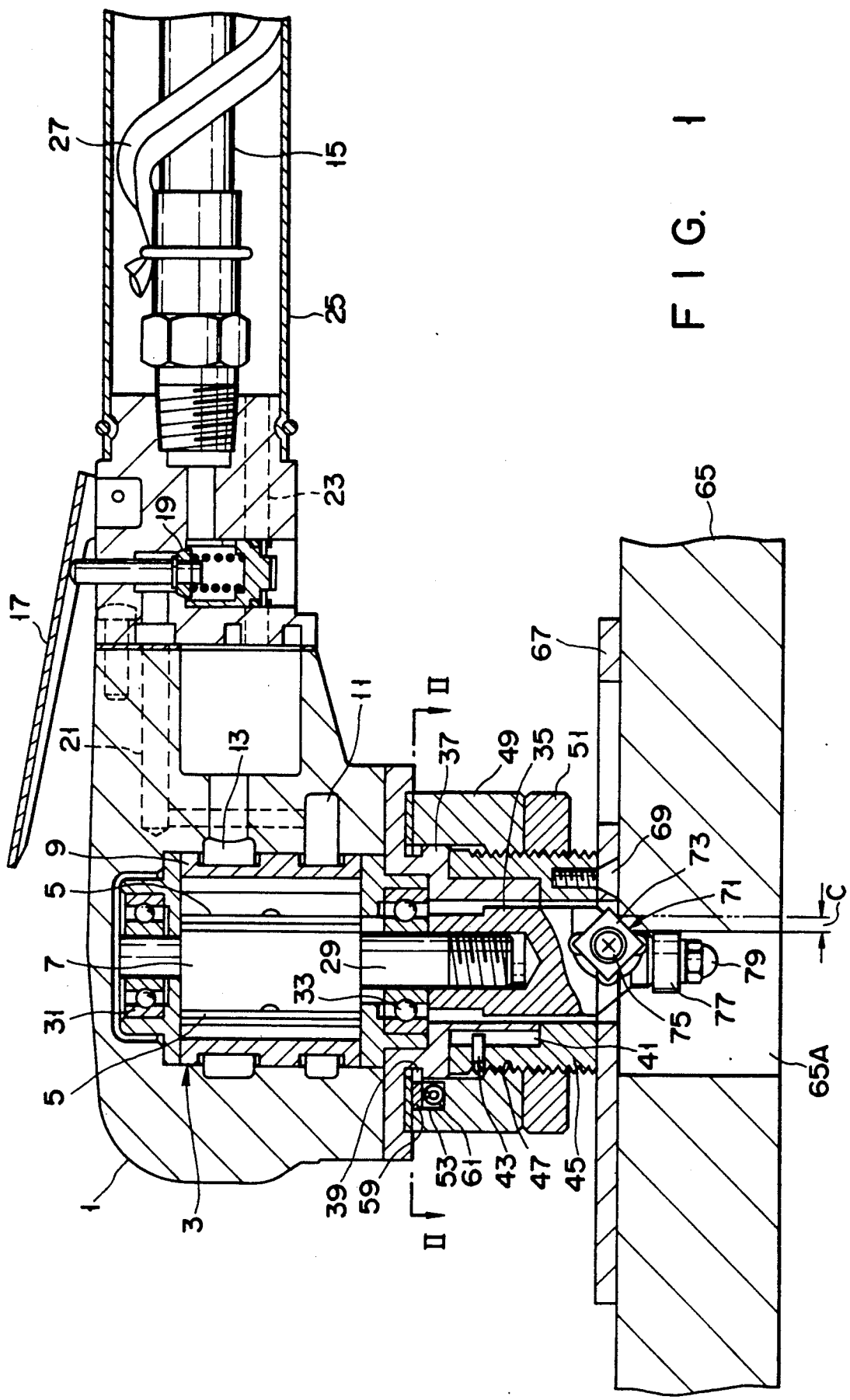

In the case of a first embodiment of the chamfering tool shown in FIG. 1, an air motor 3 which serves as a drive source is housed in a substantially L-shaped casing 1. The air motor 3 includes a cylinder 9 and a rotor 7 rotatably arranged in the cylinder 9 and provided with plural blades 5 which are elastically urged in the centrifugal direction of the rotor 7 when the rotor 7 is being rotated. The rotor 7 is driven by the repeat of air supply and discharge in such a way that compressed air is supplied through a port 11 into a space enclosed by the blades 5 and the inner circumference of the cylinder 9 to expand the space while air in another space similarly enclosed by the other blades 5 and the inner circumference of the cylinder 9 is compressed and discharged outside through a port 13. Compressed air supplied through a hose 15 connected to the rear end of the casing 1 is introduced into the motor 3, passing through a valve 19 where compressed air is allowed to selectively pass the valve 19 by the operation of a lever 17, a path 21 connected to the valve 19, and the port 11. Air discharged from the air motor 3 is introduced outside the tool, passing through the port 13, a path 23 and a hose 25. The air supply hose 15 is coaxially housed in the air discharge hose 25 and a strip-like sponge 27 is wound like a spiral round the hose 15 to kill air discharge noise and position the hose 15 in the center of the hose 25.

Figure 2:
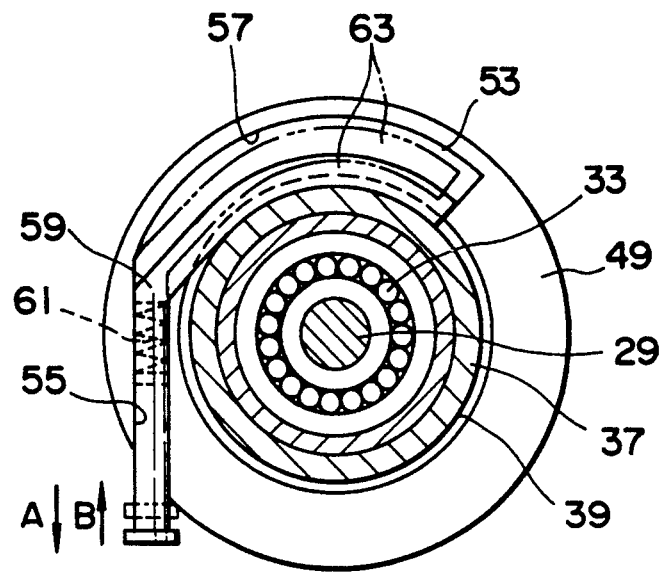

A shaft 29 of the air motor 3 is combined with the rotor 7 as a unit and supported by the casing 1 through a pair of ball bearings 31 and 33. A rotating shaft 35 is coaxially and fixedly screwed onto that portion of the motor shaft 29 which is projected from the bottom end of the casing 1. A ring-shaped connector 37 is fixed to the lower end of the casing 1 by an appropriate means, keeping its axial line aligned with that of the rotating shaft 35. A ring-shaped groove 39 is formed on the outer circumference of the ring-shaped connector 37 and a key groove 41 is also formed thereon, extending in the axial direction of the connector 37. A ring-shaped boss 45 is fitted onto the ring-shaped connector 37, freely movable in the axial direction of the connector 37 and keeping a key 43 engaged with the key groove 41 on the connector 37. Adjusting and fixing rings 49 and 51 are engaged with a male screw thread 47 on the outer circumference of the ring-shaped boss 45. A recess 53 is formed on the top of the adjusting ring 49, comprising a linear portion 55 communicated with outside the tool and a curved portion 57 opened at the ring-shaped groove 39 on the outer circumference of the ring-shaped connector 37, as shown in FIG. 2. A connecting plate 59 is arranged in the groove 53 and urged in the outward direction (or direction shown by an arrow A in FIG. 2) by a spring 61, with its curved portion 63 engaged with the ring-shaped groove 39 to hold the ring-shaped boss 45. When the connecting plate 59 is pushed against the spring 61 in a direction shown by an arrow B in FIG. 2, its curved portion 63 is released from the ring-shaped groove 39 into the groove 53. When this pushing is released, it is again returned to its original position, allowing its curved portion 63 to be engaged with the ring-shaped groove 39 to hold the ring-shaped boss 45.

A guide plate 67 which is placed on the surface of a matter 65 to be processed is tightly attached to the bottom of the ring-shaped boss 45 by a screw 69, perpendicular to the rotating shaft 35. The rotating shaft 35 is passed in the center of the ring-shaped boss 45 and projected from the underside of the guide plate 67. Detachably fixed by a screw 75 to this portion of the rotating shaft 35 which is projected from the underside of the guide plate 67 is a square-shaped cutter chip 73, each of its four sides having a cutting blade 71, in such a way that its one side is opposed to the underside of the guide plate 67 at an angle of 45°, for example. A part of the chip 73 is projected in this case from the underside of the guide plate 67. A bearing 77 which serves as a guide contacted with and rotated along the side of the matter 65 is fixed to the front end of the rotating shaft 35 by means of a cap nut 79.

When the cutter chip 73 is directed front side as shown in FIG. 1, the amount C of the matter 65 chamfered by the cutting blade 71 of the cutter chip 73 is obtained by cutting that rim portion of the matter 65 which is located outside a line formed by the cutting blade 71 crossing the underside of the guide plate 67 and the outer circumference of the guide bearing 77. Therefore, the amount C of the matter 65 chamfered can be adjusted by rotating the adjusting ring 49 on the ring-shaped boss 45 to move the boss 45 in the axial direction of the rotating shaft 35. In other words, it can be adjusted by adjusting the cutting blade 71 projected downward from the underside of the guide plate 67. The amount of the guide plate 67 moved this time can be readily determined by what a screw pitch the adjusting ring 49 and how many times the ring 49 is rotated. When the ring-shaped boss 45 is detached from the ring-shaped connector 37, the cutter chip 73 is completely exposed outside the tool.

Figure 3:
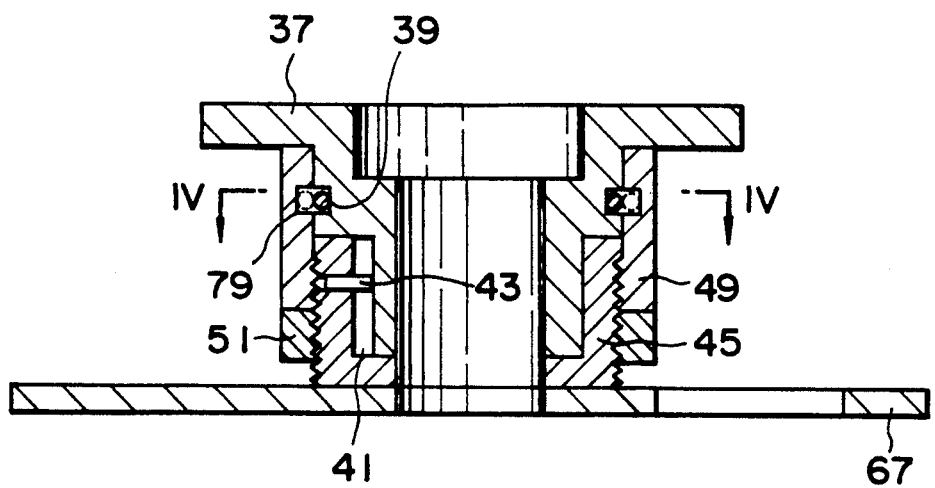

FIGS. 3 through 5 show a second embodiment of the chamfering tool according to the present invention, in which the ring-shaped groove 39 is formed on the outer circumference of the ring-shaped connector 37 while a groove 79 which is opposed to the ring-shaped groove 39 is formed on the inner circumference of the adjusting ring 49. As shown in FIG. 4, a center portion of a C-shaped connecting ring 85 is seated in the groove 79 and free ends 83A and 83B of the connecting ring 85 are projected outside the adjusting ring 49. An operating member 87 is attached to the free ends 83A and 83B of the connecting ring 85 to spread these ends 83A and 83B in both directions, respectively, as shown by arrows in FIG. 4. When the operating member 87 is operated, therefore, parts of the connecting ring 85 are moved between the ring-shaped groove 39 of the ring-shaped connector 37 and the groove 79 of the adjusting ring 49 and when these parts of the connecting ring 85 are in the ring-shaped groove 39 of the ring-shaped connector 37 as shown in FIG. 4, they hold the ring-shaped boss 45.

When the connecting ring 85 is in the groove 79 of the adjusting ring 49 as shown in FIG. 5, the ring-shaped boss 45 can be detached from the ring-shaped connector 37 and this enables any of the cutting blades 71 to be exchanged with a new one. The second chamfering tool is same in arrangement as the first one except the above-described point.

It will be described below how the first chamfering tool is used or operated.

The amount of the matter 65 chamfered is adjusted as follows: The fixing ring 51 is loosened and the adjusting ring 49 is then turned. The ring-shaped boss 45 which is fitted onto the ring-shaped connector 37 with the key 43 engaged with the key groove 41 is thus moved in the axial direction of the connector 37, so that the extent to which the cutting blade 71 is projected downward from the underside of the guide plate 67 can be changed to chamfer the rim or edge of the matter 65 by a predetermined amount. The fixing ring 51 is then tightened to fix the adjusting ring 49.

After the amount of the matter 65 chamfered is set in this manner, the air motor 3 is made operative to rotate the shaft 35. When the inner rim of a hole 65A in the matter 65 is to be chamfered, the underside of the guide plate 67 is mounted on the surface of the matter 65, inserting the front end portion of the rotating shaft 35 which is projected downward from the underside of the guide plate 67 into the hole 65A of the matter 65. When the chamfering tool is moved, pressing the outer circumference of guide bearing 77 against the inner circumference of the hole 65A, the guide bearing 77 is guided along the inner circumference of the hole 65A, thereby enabling the cutting blade 71 which is fixed to the rotating shaft 35 together with the guide bearing 77 to chamfer the inner rim of the hole 65A by the predetermined amount. When outer rims of the matter 65 or those of the curved face of the matter 65 are to be chamfered, the guide bearing 77 is similarly moved along that side of the matter 65 which has the rim to be chamfered, so that the cutting blade 71 which is fixed to the rotating shaft 35 together with the guide bearing 77 can chamfer the rim of the matter 65 by the predetermined amount.

When the cutting blade is to be exchanged with a new one, the connecting plate 59 is pushed against the spring 61 in the direction B. The curved portion 63 of the connecting plate 59 is thus released from the ring-shaped groove 39 of the ring-shaped connector 37 (as shown by a two-dot and dash line in FIG. 2). Keeping the curved portion 63 of the connecting plate 59 under this state, the ring-shaped boss 45 is pushed downward and detached from the ring-shaped connector 37, thereby exposing the cutting blades 71 completely outside the tool. The screw 75 is then loosened to exchange the cutter chip 73 with a new one or turn the cutter chip 73 by 90° to move an unused cutting blade of the cutter chip 73 to the cutting position.

When the above operation is reversed, the ring-shaped boss 45 is attached to the ring-shaped connector 37.

In the case of the second chamfering tool shown in FIGS. 3 through 5, the amount of the matter 65 chamfered can be adjusted in the same manner as described in the case of the first chamfering tool. Therefore, it will be described how the cutting blade is exchanged with a new one. The member 87 is operated to spread the free ends 83A and 83B of the connecting ring 85 in the directions D. Those parts of the connecting ring 85 which extend from its center portion 81 to the both free ends 83A and 83B are thus moved outward, using the center portion 81 as their center, and released from the ring-shaped groove 39 of the ring-shaped connector 37 into the groove 79 of the adjusting ring 49. Keeping the connecting ring 85 under this state, the ring-shaped boss 45 is pushed downward and removed from the ring-shaped connector 37. The cutting blades 71 can be thus exposed completely outside the tool. When the screw 75 is loosened under this state, the cutter chip 73 can be exchanged with a new one. The cutter chip 73 can also be turned by 90° to move an unused cutting blade 71 to the cutting position. When the above operation is reversed, the ring-shaped boss 45 can be attached to the ring-shaped connector 37.

Power is not transmitted from the motor shaft directly to the cutter chip but it may be transmitted to the cutter chip through gears and the like. In addition, the power source for rotating the cutter chip is not limited to the air motor but it may be hydraulic and electric motors. Further, the guide bearing can be changed to not-rotating ring or ball and these ring and ball may be formed directly on the rotating shaft itself. In this case, however, the distance extending from the axial center of the rotating shaft to the surface of the guide (or radius of the guide bearing in the present invention) must be determined taking the amount of a matter chamfered into consideration. In addition, the face of the guide must be contacted with the side of the matter without fail while the rim of the matter is being chamfered.

It should be understood that the present invention is not be limited to the above-described embodiments and that various changes and modifications can be made without departing from the spirit and scope of the present invention.

What is claimed is:

1. A portable chamfering tool comprising:
   a casing;
   a rotating shaft projected from one end of the casing;
   a ring-shaped connector arranged on the outer circumference of the rotating shaft, and having a ring-shaped groove formed on the outer circumference of the ring-shaped connector;
   a ring-shaped boss attached to the outer circumference of the ring-shaped connector so as to freely move in the axial direction of the connector;
   a guide plate attached to the ring-shaped boss;
   adjusting and fixing rings screwed onto the ring-shaped boss, the adjusting ring having a recess formed at the upper portion thereof;
   a connecting plate movably arranged in the recess of the adjusting ring and urged to the center of the ring-shaped connector to engage the ring-shaped groove on the outer circumference of the ring-shaped connector;
   a cutter chip fixed to the rotating shaft, which passes through the ring-shaped boss, with a part of it projected downward from the underside of the guide plate; and
   a guide attached to the rotating shaft and contactable with a side of a matter to be processed.

2. The portable chamfering tool according to claim 1, further comprising a key attached to said ring-shaped boss, and wherein said ring-shaped connector has a key groove on the outer circumference thereof, extending along the axial line of the rotating shaft, and the key is engaged with the key groove.

3. The portable chamfering tool according to claim 1, wherein said connecting plate is shaped like an arc.

4. A portable chamfering tool comprising:
   a casing;
   a rotating shaft projected from one end of the casing;
   a ring-shaped connector arranged on the outer circumference of the rotating shaft, and having a ring-shaped groove formed on the outer circumference of the ring-shaped connector;
   a ring-shaped boss attached to the outer circumference of the ring-shaped connector so as to freely move in the axial direction of the connector;
   a guide plate attached to the ring-shaped boss;
   adjusting and fixing rings screwed onto the ring-shaped boss, the adjusting ring having a recess formed on the inner circumference of the adjusting ring;
   a C-shaped connecting member having a pair of free ends and located between the ring-shaped groove of the ring-shaped connector and the recess of the adjusting ring;
   an operating member attached to the free ends of the connecting member to spread the free ends so as to release the ring-shaped boss from the ring-shaped groove when the boss is to be removed;
   a cutter chip fixed to the rotating shaft, which passes through the ring-shaped boss, with a part of it projected downward from the underside of the guide plate; and
   a guide attached to the rotating shaft and contactable with a side of a matter to be processed.

5. The portable chamfering tool according to claim 4, further comprising a key attached to said ring-shaped boss, and wherein said ring-shaped connector has a key groove on the outer circumference thereof, extending along the axial line of the rotating shaft, and the key is engaged with the key groove.

6. The portable chamfering tool according to claim 4, wherein said connecting member has a center portion projected outward therefrom.

7. The portable chamfering tool according to claim 4, wherein said operating member is a screw screwed to the free ends of said connecting member.

* * * * *